United States Patent
Oh

[11] Patent Number: 5,359,860
[45] Date of Patent: Nov. 1, 1994

[54] METHOD AND APPARATUS FOR CONTROLLING A TEMPERATURE IN A REFRIGERATING CHAMBER OF A REFRIGERATOR

[75] Inventor: Sa Yoon Oh, Seoul, Rep. of Korea

[73] Assignee: Goldstar Co. Ltd., Seoul, Rep. of Korea

[21] Appl. No.: 939,515

[22] Filed: Sep. 3, 1992

Related U.S. Application Data

[63] Continuation of Ser. No. 685,848, Apr. 16, 1991, abandoned.

[51] Int. Cl.⁵ .................. F25D 17/06; G05D 23/00
[52] U.S. Cl. ........................... 62/97; 236/13; 454/269
[58] Field of Search .............. 62/186, 209, 179, 97; 236/13; 454/269

[56] References Cited

U.S. PATENT DOCUMENTS

| | | | |
|---|---|---|---|
| 3,026,688 | 1/1961 | O'Connell | 62/178 |
| 3,973,618 | 8/1976 | Naley et al. | 62/213 X |
| 4,730,461 | 3/1988 | Meckler | 62/187 X |
| 4,732,009 | 3/1988 | Frohbieter | 62/97 X |
| 4,924,680 | 5/1990 | Janke et al. | 62/187 |
| 4,942,921 | 7/1990 | Haessig et al. | 236/13 X |
| 4,977,752 | 12/1990 | Hanson | 62/213 X |
| 4,996,849 | 3/1991 | Burst et al. | 62/186 X |

Primary Examiner—William E. Wayner
Attorney, Agent, or Firm—Denton L. Anderson

[57] ABSTRACT

A method and apparatus for controlling a temperature in a refrigerating chamber of a refrigerator by sensing the temperature of cold-air by firsh and second temperature sensors disposed in the vicinity of cold-air suction and in feed ports, and finely adjusting the suction and feeding of the cold-air by fans disposed in the ports and dampers disposed in the suction port and a cold-air feed passage according to the sensed temperature conditions, whereby local over-refrigeration and cold-air drift phenomena developed in the refrigerating chamber are prevented and the temperature in the chamber is uniformly controlled.

15 Claims, 4 Drawing Sheets

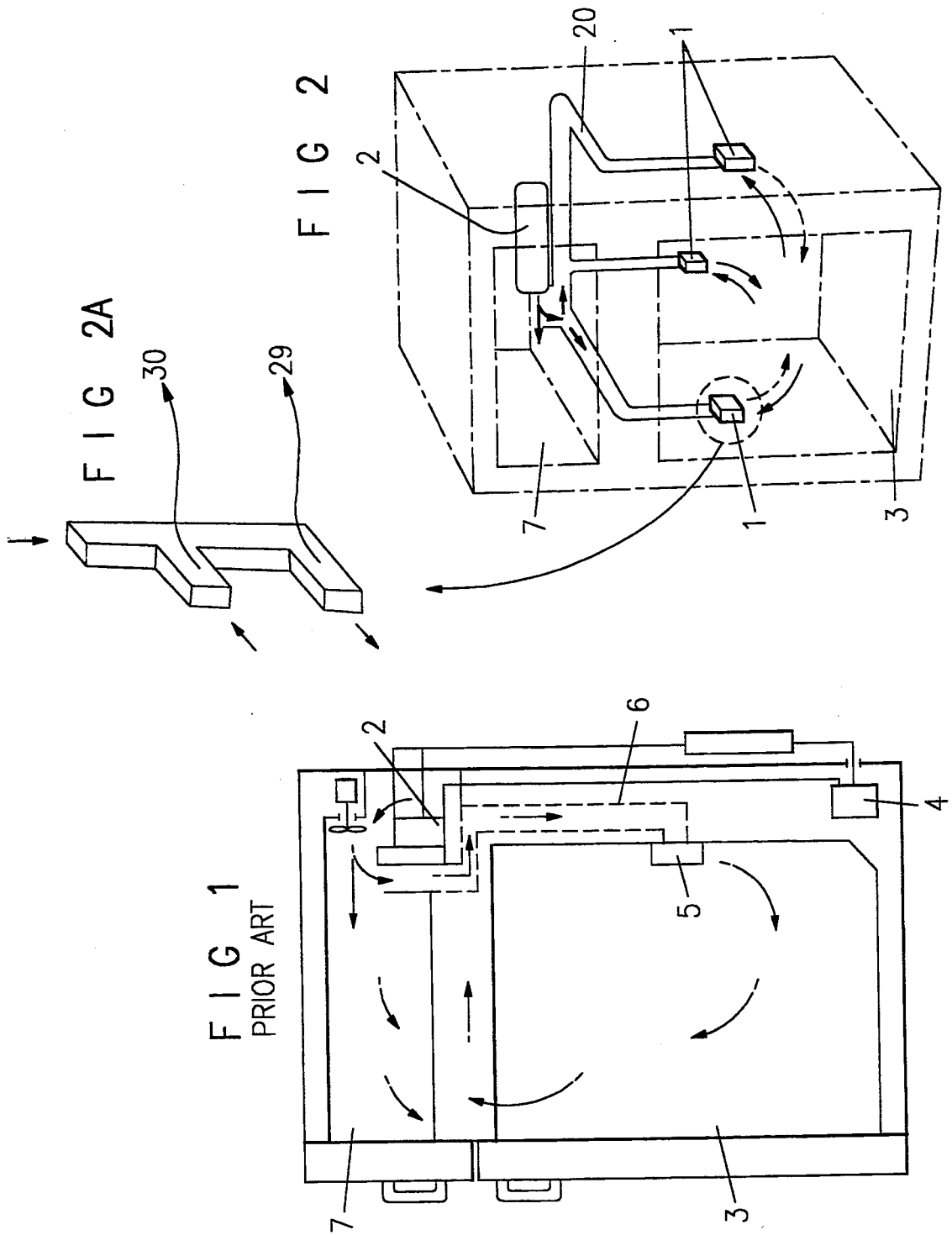

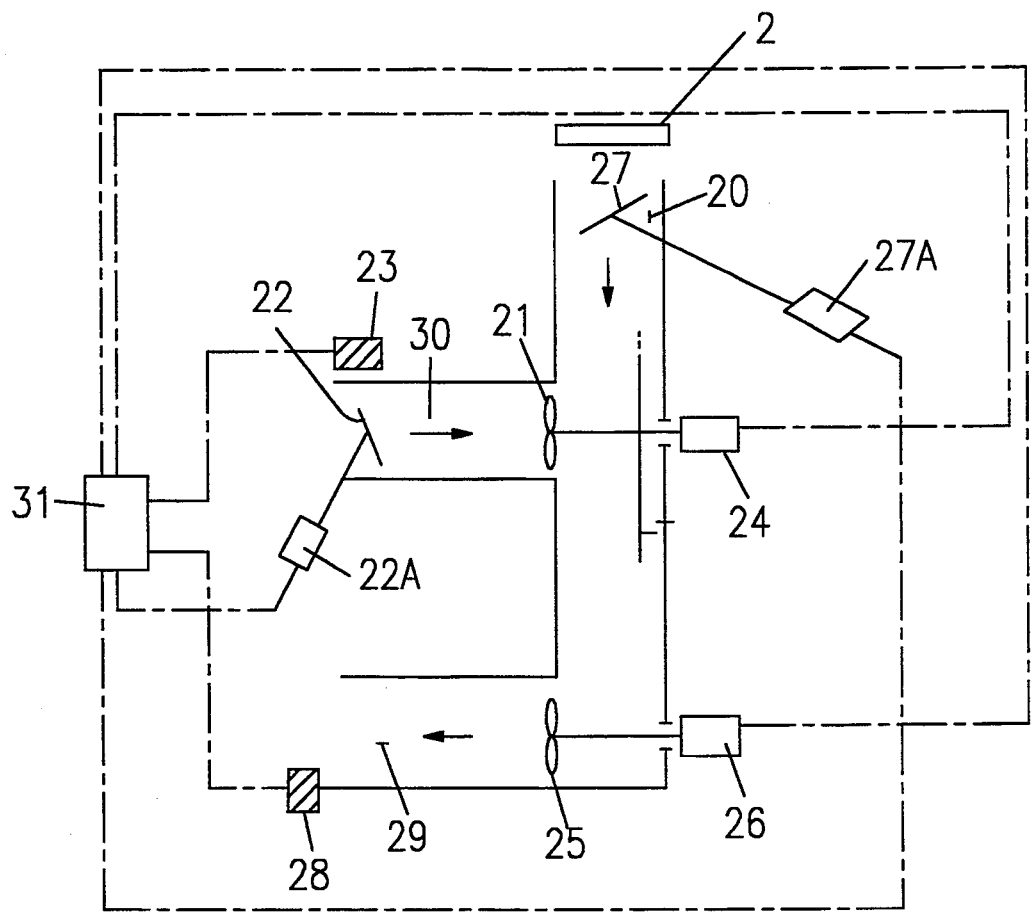

METHOD AND APPARATUS FOR CONTROLLING A TEMPERATURE IN A REFRIGERATING CHAMBER OF A REFRIGERATOR

This application is a continuation of application Ser. No. 07/685,848, filed Apr. 16, 1991, now abandoned.

BACKGROUND OF THE INVENTION

1. Field of the Invention

The present invention relates to a method of and apparatus for controlling a temperature in a refrigerating chamber of a refrigerator to uniformly maintain the temperature in the refrigerating chamber.

2. Description of the Prior Art

A cold-air feeding apparatus of a prior art refrigerator is of a type as shown in FIG. 1 of the accompanying drawings. In the apparatus, cold-air refrigerated to a temperature of about $-25°$ C. $\sim -30°$ C. when passing through an evaporator(2) is fed into both the freezing chamber(7) and the refrigerating chamber(3). The cold air is fed from the evaporator(2) into a refrigerating chamber(3) through a feed passage(6) communicating with the refrigerating chamber(3). At this time, the refrigerating chamber is maintained at a temperature of about $3°$ C. by the cold air being fed from the evaporator(2). In this state, when the temperature in the freezing chamber rises above a set temperature and the rising of the temperature is sensed, a compressor(4) is operated to circulate a refrigerant, and the evaporator(2) refrigerates the ambient air and feeds again the cold air into both the freezing and the refrigerating chamber to lower the temperature in the chambers.

However, the manner of controlling the temperature in the refrigerating chamber by feeding the cold air of about $-25°$ C. $\sim -30°$ C. into the chamber through the feed passage, as discussed above, develops a local over refrigeration phenomenon in which the foodstuffs positioned near a cold air feed port(5) are easily frozen by the cold-air of the low temperature being constantly fed into the refrigerating chamber, and cold-air drift phenomenon in which the cold air is not spread uniformly through out the refrigerating chamber, but accumulates in a portion of the chamber, resulting in nonuniformity of the temperature in the refrigerating chamber. There is accordingly a need for eliminating such local over-refrigeration and cold-air drift phenomena so that fresh foodstuffs can be preserved more reliably in the refrigerating chamber.

SUMMARY OF THE INVENTION

In view of the aforesaid problem of the prior art, it is an object of the present invention to improve a method of and apparatus for controlling a temperature in a refrigerating chamber of a refrigerator to eliminate local over-refrigeration and cold-air drift phenomena of the prior art by finely adjusting the temperature in the refrigerating chamber.

To achieve the above object, there is provided according to one aspect of the present invention a method of controlling a temperature in a refrigerating chamber of the refrigerator comprising the steps of, (a) sensing a first temperature of cold-air by a first temperature sensor disposed in the vicinity of a cold air suction port, (b) when the sensed first temperature is higher than a maximum set temperature, feeding the cold-air into the chamber according to the following steps (d), (e) and (f), (c) sensing a second temperature of the cold-air by a second temperature sensor disposed in a cold-air feed port, (d) when the sensed first temperature is higher than a maximum set temperature, feeding the cold-air only from the evaporator into the refrigerating chamber, (e) when the sensed first temperature lies between the said maximum set temperature and a minimum set temperature, if the sensed first temperature does not descend, minutely reducing the suction and increasing the feeding of the cold air fed from the evaporator, if the sensed first temperature descends, adjusting the mixing ratio of the suction and the feeding of cold air, and making the difference between the first and the second temperatures lies between the upper tolerance $\Delta T1$ and the lower tolerance $\Delta T2$: $\Delta T2 <$ (first sensed temperature) $-$ (second sensed temperature) $< \Delta T1$, (f) when the sensed first temperature is not higher than the said minimum set temperature, stopping the suction and feeding of the cold air.

According to another aspect of the present invention, there is provided an apparatus for controlling a temperature in a refrigerating chamber of a refrigerator, disposed at least one on wall surfaces of the chamber, said apparatus comprising cold-air passage means extending to the refrigerating chamber and having a cold-air suction port and cold-air feed port separately formed, first and second temperature sensors disposed in the vicinity of cold-air suction and in the feed ports respectively, to sense the temperature in the refrigerating chamber, suction and feed means mounted in the cold-air suction and feed ports, respectively, to generate a compulsory flow of the cold air, and first and second opening and closing means disposed in the cold-air suction port and the cold-air passage means, respectively, to open and shut the suction port and the passage, thereby controlling the flow of the cold air passing through them, whereby the control of the temperature in the refrigerating chamber is carried out by finely adjusting mixing of the cold air sucked in from the refrigerating chamber through the cold-air suction port with the cold air being fed from the evaporator into the refrigerating chamber through the cold-air passage means.

BRIEF DESCRIPTION OF THE DRAWINGS

The invention will be more fully understood from the following detailed description thereof, taken in connection with the accompanying drawings which form a part of this application and in which;

FIG. 1 is a schematic section view of the prior art refrigerator showing the feed and circulation condition of cold-air in the refrigerator;

FIG. 2 is a schematic view of a refrigerator incorporating the temperature control apparatus of the present invention disposed on the rear and opposite side surfaces of the refrigerating chamber;

FIG. 2a is a schematic closeup view of a temperature control apparatus showing the feeding and suction process to and from the refrigerating chamber, respectfully;

FIG. 3 is a diagrammatic view of the apparatus of the present invention;

DESCRIPTION OF THE PREFERRED EMBODIMENT

Figure 4A:
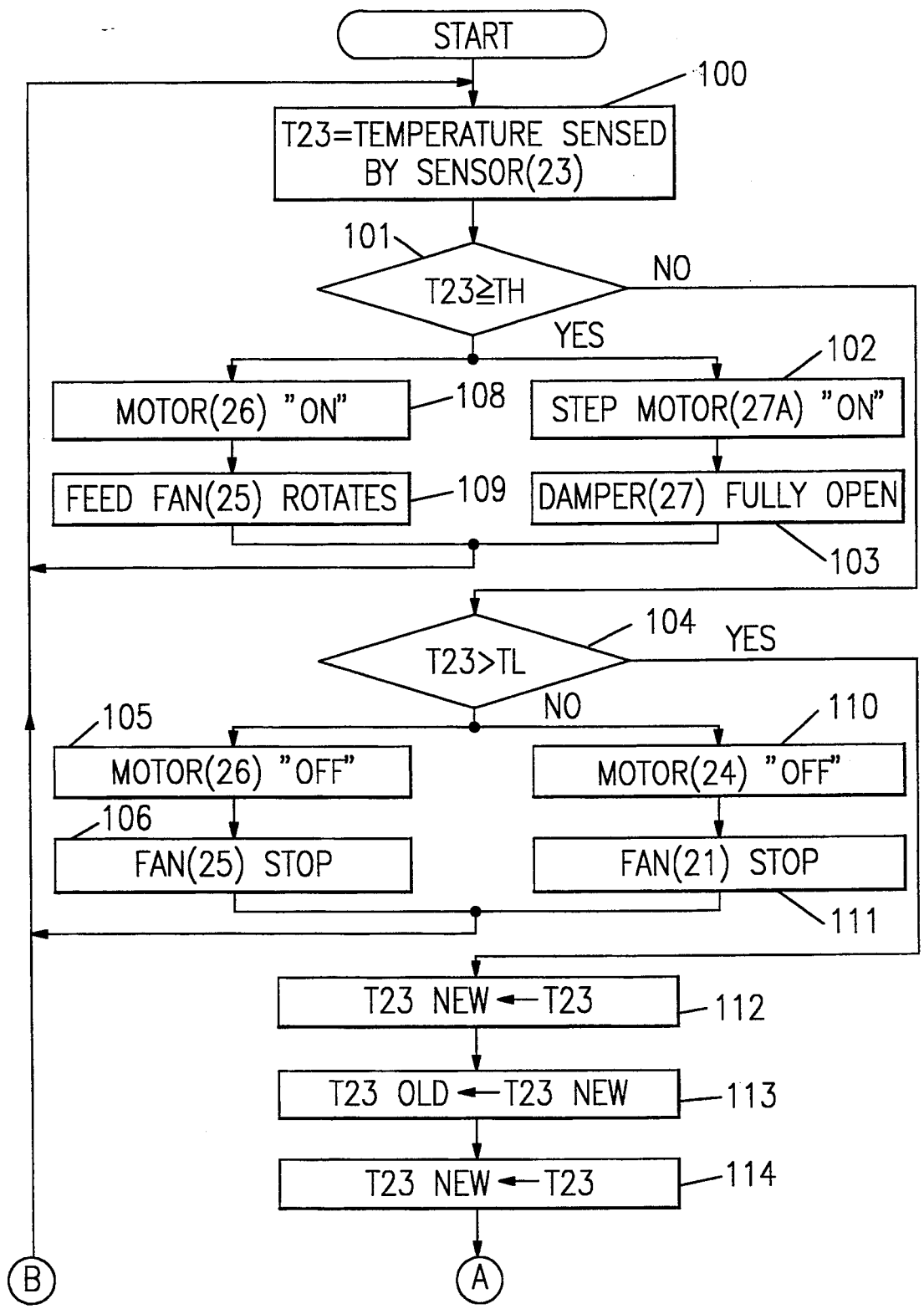
FIG. 4a is the first part of a flow chart of a control program for carrying out the temperature control method of the present invention.

Referring first to FIG. 3, there is diagrammatically shown an apparatus according to the present invention, for controlling a temperature in a refrigerating chamber of a refrigerator. Cold-air passage means, i.e., a feed passage(20) through which first cold-air is fed from evaporator into the refrigerating chamber has a cold-air feed port(29) and a suction port(30) separately formed at its leading end. First and second temperature sensors(23,28) are mounted in the vicinity of the cold-air suction and on the feed ports(30,29), respectively, to sense the temperatures of the air around the suction port and passing through the feed port. Further, suction means, i.e., a suction fan(21) for sucking in a second cold air from the refrigerating chamber is disposed in the cold-air suction port(30), and feed means, i,e., a feed fan(25) for feeding a third cold-air into the refrigerating chamber is disposed in the cold-air feed port(29). Thus, the cold-air may be compulsorily sucked in or discharged by the rotation of the fans.

Furthermore, this apparatus comprises first control means including opening and closing means, i.e., a suction damper(22) disposed in the cold-air suction port(30) to open and shut the port through which the second cold air is sucked in from the refrigerating chamber by means of the suction fan(21), and control means including second opening and closing means, i.e., a feed damper(27) disposed in the feed passage(20) to open and shut the passage for the first cold air being fed from the evaporator to the refrigerating chamber.

Therefore, the flow of the cold air may be controlled by adjusting the extent of the opening of the suction and feed dampers(22,27). The suction and feed fans(21,25) are actuated by means of motors(24,26), each connected to each of them. The suction and feed dampers(22,27) disposed in the suction port(30) and the feed passage(20) to control the amount of the cold air flowing through them are adjusted by means of opening and closing devices (22a,27a), each connected to each of the dampers. Referring to FIG. 2, there is a schematic view of the refrigerator incorporating an evaporator (2) which feeds the first cold air, and a feed passage (20) which allows passage of the first cold air from the evaporator (2) through the temperature control apparatus (1), and into the refrigerating chamber (3). Referring to FIG. 2a, there is a schematic closeup view of a temperature control apparatus (1) illustrating a cold air feed port (29) and a suction port (30) separately formed at the leading edge of the feed passage (20). Although such a temperature control apparatus may be disposed on only one wall surface of the refrigerating chamber, it is preferable to mount the temperature control apparatuses on each side of the refrigerating chamber as shown in FIG. 2, whereby the local over-refrigeration and cold-air drift phenomena may be eliminated more efficiently and the temperature in the refrigerating chamber may be finely controlled to obtain the uniform distribution of the temperature in the chamber. Although such a temperature control apparatus may be disposed on only one wall surface of the refrigerating chamber, it is preferable to mount the temperature control apparatuses on each side of the refrigerating chamber as shown in FIG. 2, whereby the local over-refrigeration and cold-air drift phenomena may be eliminated more efficiently and the temperature in the refrigerating chamber may be finely controlled to obtain the uniform distribution of the temperature in the chamber.

The operation of the temperature control apparatus having the construction as described above is carried out by a cold-air feed control program of a system microprocessor designated by reference numeral 31 in FIG. 3. The system microprocessor(31) controls the temperature in the refrigerating chamber according to a series of the processing steps in the flow chart of the control program shown in FIG. 4a and FIG. 4b.

Figure 4B:
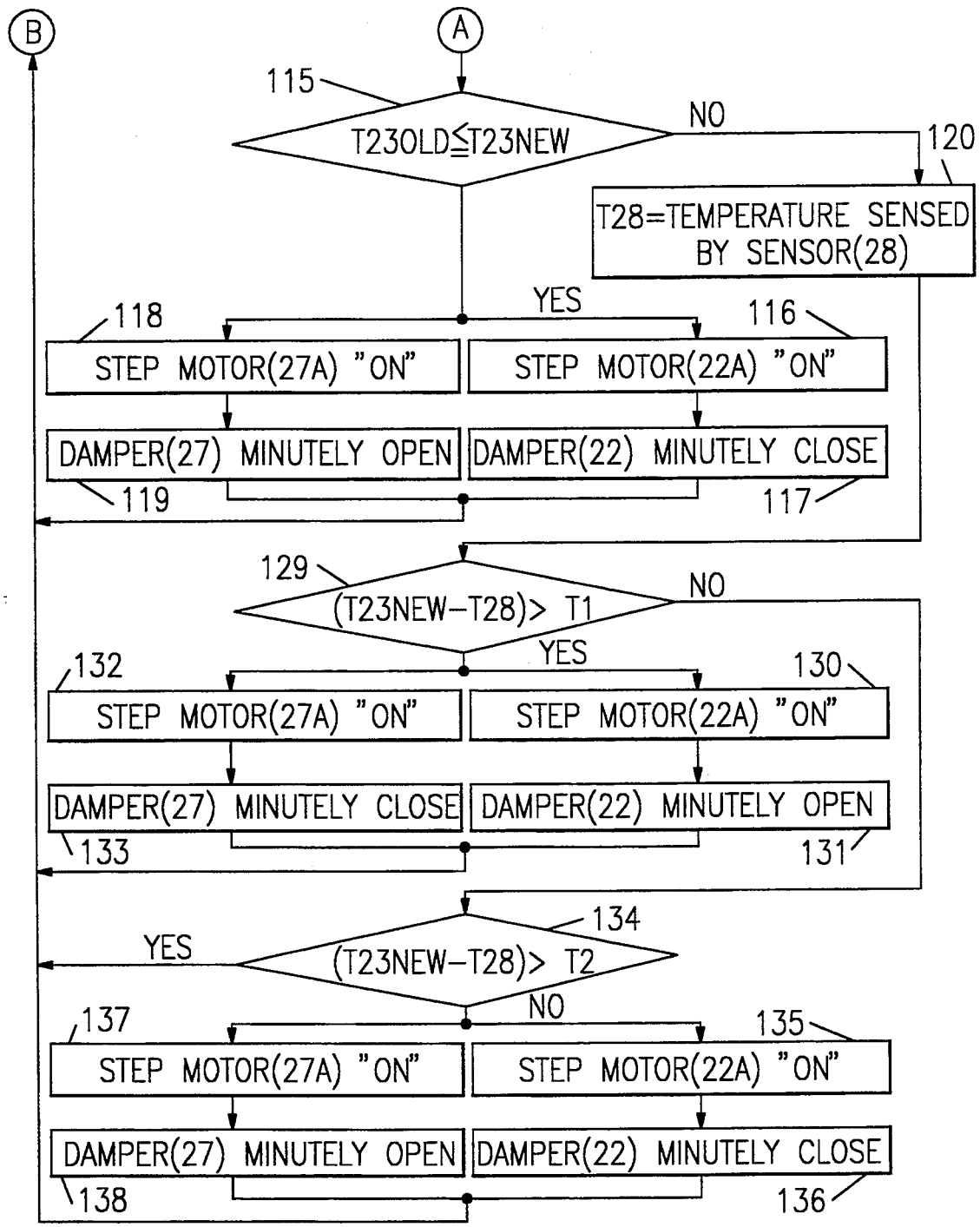
FIG. 4b is the second part of a flow chart of a control program for carrying out the temperature control method of the present invention.

The manner of controlling the temperature in the refrigerating chamber will now be explained in detail with reference to the flow chart of FIG. 4a and FIG. 4b. In Step 100, the first temperature sensor(23) senses the temperature of the cold air in the vicinity of the suction port and the sensed temperature is given as "$T_{23}$". Then, the process advances to Step 101 to compare the sensed temperature $T_{23}$ with the maximum set temperature TH and decide whether or not the sensed temperature is higher than the set temperature. In the decision, if the answer is yes, the process advances along line "Yes" to Steps 102 and 103 wherein step motor(27a) is energized and thus the damper(27) is fully opened and Steps 108 and 109 wherein the motor(26) is energized and thus the feed fan(25) is actuated. According to the actuation of the feed fan, the cold air is compulsorily circulated in the refrigerating chamber, whereby the temperature may be uniformly distributed throughout the chamber. On the other hand, when the sensed temperature is not higher than the set temperature, the process advances along line "No" to Step 104 to compare the sensed temperature $T_{23}$ with the minimum set temperature $T_L$ and decide whether or not $T_{23}$ is higher than $T_L$. In the decision, if the answer is no, the process advances along line "No" to Steps 105, 106 and 110, 111 wherein the motors(24,26), fans(21,25) are stopped and the cold air is also not circulated.

On the other hand, when $T_{23}$ is higher than $T_L$, the process advances along line "Yes" to Steps 112, 113, 114 and 115 wherein the sensed temperature $T_{23}$ is checked whether $T_{23}$ is ascending or not with time. If $T_{23}$ does not descend (therefore $T_{23}$ New is not lower than $T_{23}$ old), the process advances along line "Yes" to Steps 116, 117 and 118, 119 wherein the suction damper(22) is minutely closed and the feed damper(27) is minutely opened, so that the temperature of the mixed cold air becomes lower. If $T_{23}$ descend, the process advances along line "No" to Steps 120, wherein the temperature of the cold air in the feed port(29) is sensed by the sensor (28) and is given as $T_{28}$. In Step 129,130,131,132,133,134,135,136,137 and 138, the difference between $T_{23}$ and $T_{28}$ is checked and controlled to lie between the upper tolerance $\Delta T1$ and the lower tolerance $\Delta T2: \Delta T2 < (T_{23} - T_{28}) < \Delta T1$, by opening and closing of dampers (22,27).

As discussed above, the control of the temperature in the refrigerating chamber is carried out by the circulating of the cold air wherein the second cold air is sucked in from the refrigerating chamber to the feed passage through the cold-air suction port(3), mixed with the first cold air of the low temperature being fed from the evaporator(2) into the refrigerating chamber through the feed passage(20), and then introduced into the refrigerating chamber. In accordance with the operation, as described above, the opening and closing the feed damper(27) disposed in the feed passage(20), opening and closing the suction damper(22) disposed in the cold-air suction port(30) and actuating the suction and feed fans(21,25) disposed in the cold-air suction and feed ports(30,29), is according to the temperature conditions sensed by the first and second temperature sensors(23,28) mounted in the vicinity of the cold-air suction and at the cold air feed ports(30,29), respectively.

Generally, specific heat per volume of air of 0° C., Ca, is 1.3 KJ/m$^{2°}$ C. and that of water of 0° C., Cw, is 422 KJ/m$^{2°}$ C. Specific heat per volume of foodstuffs is greater than that of air since the foodstuffs contain quantities of moisture. Foodstuffs refrigerated to the refrigerating temperature, 3° C., of the refrigerating chamber do not change their state more easily than air does. Therefore, if a temperature of the ambient air is maintained at 3° C., the foodstuffs keep their refrigerated state. In addition, in the night when the user does not frequently open the door of the refrigerating chamber, since the chamber is continuously supplied with the cold air of 0° C.~3° C. conditioned according to the present invention when the temperature in the chamber rises above the set temperature, for example, 5° C., the stored foodstuffs continuously maintain their refrigerated state of about 3° C. Furthermore, in case the temperature in the refrigerating chamber rises due to leakage of the cold air in the chamber by frequent opening of the door, because specific heat of foodstuffs is higher than that of air and the temperature in the refrigerating chamber does not drop below 0° C. in spite of feeding of the cold air of 0° C.~3° C. into the chamber, the foodstuffs in the refrigerating chamber are maintained at a temperature of 3° C. and not frozen.

The present invention has accordingly an advantageous effect in that the cold-air drift and local over-refrigeration phenomena may be prevented or eliminated by the control of the amount of the fed cold air by means of the dampers actuated according to the temperature conditions checked by the temperature sensors mounted in the vicinity of the cold-air suction and at the feed ports, and the fine adjustment of the temperature in the refrigerating chamber by the compulsory flow of the cold air generated by the suction and feed fans.

While the invention has been particularly shown and described with reference to a preferred embodiment thereof, it will be understood by those skilled in the art that foregoing and other changes in form and details can be made therein without departing from the spirit and scope of the invention.

What is claimed is:

1. A method of controlling a temperature in a refrigerating chamber of a refrigerator wherein there are a first cold air, a second cold air, and a third cold air comprising the steps of:
    (a) sensing a first temperature of the second cold-air by a first temperature sensor disposed in the vicinity of a cold-air suction port;
    (b) sensing a second temperature of the third cold-air by a second temperature sensor disposed in the vicinity of the third cold-air feed port;
    (c) when the sensed first temperature is higher than a maximum set temperature, feeding the .first cold-air into the refrigerating chamber, and if not, determining whether the sensed first temperature is higher than a minimum set temperature;
    (d) when the sensed first temperature is not higher than the minimum set temperature, an air circulation is stopped, and when the sensed first temperature is higher than the minimum set temperature, the sensed first temperature is checked to determine whether it is descending or not;
    (e) when the sensed first temperature is not descending, reducing the a flow of the second cold-air and increasing the feeding of the third cold air flow, and when the sensed first temperature is descending, maintaining the difference between the sensed first temperature and the sensed second temperature to lie between an upper tolerance and a lower tolerance by controlling the mixing of the flow of the first cold air and the feeding of the third cold air.

2. A method as claimed in claim 1 wherein the second temperature sensor is in the third cold-air feed port.

3. An apparatus for controlling a temperature in a refrigerating chamber of a refrigerator, disposed at least adjacent to a surface of the chamber, said apparatus comprising:
    cold-air passage means extending to said refrigerating chamber and having a cold-air suction port and a cold-air feed port;
    first and second temperature sensors disposed in the vicinity of the cold-air suction port and disposed the vicinity of the feed port;
    suction means mounted Operatively with the cold-air suction port and feed means mounted operatively with the feed port for generating a flow of cold air in the refrigerator chamber;
    first control means in the cold-air suction port and second control means a cold-air passage means from an evaporator for opening and shutting the suction port and the passage means thereby controlling the flow of the cold air passing through the suction port and passage means; and
    a system microprocessor controlling the operation of the suction means and feed means and the first and second control means according to the temperatures sensed by the said first and second temperature sensors;
    whereby the control of the temperature in the refrigerating chamber is performed by adjusting mixing of the cold air sucked in from the refrigerating chamber through the cold air suction port with the cold air fed from the evaporator into the refrigerating chamber through said cold-air passage means.

4. An apparatus as claimed in claim 3, wherein the suction means and feed means each includes a fan.

5. An apparatus as claimed in claim 3, wherein said first and second control means each includes a damper.

6. Apparatus as claimed in claim 3 wherein the second temperature sensor is in the third cold-air feed port.

7. A method of controlling a temperature in a refrigerating chamber of a refrigerator having a first cold air, a second cold air and a third cold air, comprising the steps of:
    sensing an inside temperature of the second cold air in a refrigerating chamber by a first temperature sensor;
    comparing the inside temperature with a maximum set temperature;
    feeding the first cold air from an evaporator into the refrigerating chamber to decrease the inside temperature when the inside temperature is higher than the maximum set temperature;
    comparing the inside temperature with a minimum set temperature;
    stopping the first cold air from being supplied into a cold air passage means to stop an air circulation within the refrigerating chamber when the inside temperature is lower than the minimum set temperature;

detecting the inside temperature periodically and comparing a present inside temperature detected with a previous inside temperature to determine whether said inside temperature is ascending or descending, when said inside temperature is higher than the minimum set temperature;

descending the inside temperature by controlling a mixing ratio of said first cold air sucked from the refrigerating chamber into the cold air passage means and the first cold air from the evaporator and feeding the mixed cold air as the third cold air through the third cold air feed port, when the inside temperature is ascending;

detecting a temperature of the third cold air being fed into the refrigerating chamber; and maintaining a difference between the inside temperature and the third cold air temperature within a range between an upper tolerance and a lower tolerance by controlling the mixing ratio of the third cold air being fed into the refrigerating chamber.

8. A method as claimed in claim 7, wherein the mixing ratio of the third cold air is controlled by controlling an amount of the first cold air being supplied into the cold air passage means.

9. A method as claimed in claim 7, wherein the mixing ratio of the third cold air is controlled by controlling an amount of the second cold air sucked from the refrigerating chamber into the cold air passage means.

10. A method as claimed in claim 7, wherein the mixing ratio of the third cold air is controlled by controlling the amount of the first cold air supplied into the cold air passage means and the amount of the second cold air sucked from the refrigerating chamber into the cold air passage means.

11. An apparatus, disposed adjacent at least one surface of a refrigerating chamber of a refrigerator, for controlling a temperature in the refrigerating chamber, comprising:

an evaporator for generating a first cold air;

cold air passage means having a cold air suction port through which a second cold air is sucked from the refrigerating chamber into the cold air passage means, and a cold air feed port through which a third cold air is fed into the refrigerating chamber;

first temperature sensor for sensing an inside temperature of the second cold air in the refrigerating chamber;

second temperature sensor for sensing a temperature of the third cold air fed into the refrigerating chamber;

suction means for generating a flow of the second cold air from the refrigerating chamber through the suction port into the cold air passage means and mixing the first cold air and the second cold air;

feed means for generating a flow of the third cold air from the cold air passage means through the cold air feed port into the refrigerating chamber;

first control means for controlling the first cold air;

second control means for controlling the second cold air; and a system microprocessor for comparing the inside temperature with a maximum set temperature and a minimum set temperature, respectively, comparing a temperature difference between the second cold air and the third cold air with an upper tolerance and lower tolerance respectively, determining whether the inside temperature is ascending or descending, controlling the suction means, feed means, the control means, and the second control means in accordance with the comparisons and the determination, feeding the first cold air when the inside temperature is higher than the maximum set temperature, and feeding the mixed first cold air and second cold air to maintain the temperature difference within a range from an upper tolerance to lower tolerance when the inside temperature is within a range between the maximum set temperature and the minimum set temperature.

12. An apparatus as claimed in claim 11, wherein the suction means and the feed means each includes a fan.

13. An apparatus as claimed in claim 11, wherein the first and second control means each include a damper.

14. A method for controlling a temperature in a refrigerator chamber comprising the steps of:

a. selectively directing a first cold air flow from an evaporator into a refrigerator chamber through a cold air passage means, directing a second cold air from the refrigerator chamber into a suction port, directing a third cold air to the refrigerator chamber through a feed port, wherein when the temperature of the second cold air is greater a maximum set temperature, only the first cold air from the evaporator is fed through the feed port as the third cold air, and wherein there is a minimum set temperature such that when the temperature of the second cold air is greater than the minimum temperature in the refrigerator chamber, and is not greater than the maximum set temperature, both the first cold air from the evaporator and the second cold air from the suction port are directed through the feed port as the third cold air.

15. A method as claimed in claim 14 including sensing the refrigerator temperature for determining whether the temperature in the refrigerator chamber is ascending or descending when the refrigerator temperature is higher than a minimum set temperature, and descending the refrigerator temperature when the refrigerator temperature is ascending.

* * * * *